US012498682B1

(12) United States Patent
Lyle

(10) Patent No.: US 12,498,682 B1
(45) Date of Patent: Dec. 16, 2025

(54) SYSTEMS AND METHODS FOR ADAPTIVE SPACES

(71) Applicant: NVIDIA Corporation, Santa Clara, CA (US)

(72) Inventor: Ruthie Lyle, Durham, NC (US)

(73) Assignee: NVIDIA Corporation, Santa Clara, CA (US)

( * ) Notice: Subject to any disclaimer, the term of this patent is extended or adjusted under 35 U.S.C. 154(b) by 447 days.

(21) Appl. No.: 18/063,816

(22) Filed: Dec. 9, 2022

(51) Int. Cl.
*G05B 13/02* (2006.01)
*G05B 13/04* (2006.01)
*H05B 47/105* (2020.01)

(52) U.S. Cl.
CPC ......... *G05B 13/027* (2013.01); *G05B 13/048* (2013.01); *H05B 47/105* (2020.01)

(58) Field of Classification Search
CPC ... G05B 13/027; G05B 13/048; H05B 47/105
See application file for complete search history.

(56) References Cited

U.S. PATENT DOCUMENTS

| 10,956,626 | B2 | 3/2021 | Yang et al. | |
|---|---|---|---|---|
| 2005/0015122 | A1* | 1/2005 | Mott | A61M 21/00 607/88 |
| 2016/0031090 | A1* | 2/2016 | Larrea-Tamayo | G06F 3/016 715/702 |
| 2018/0364654 | A1* | 12/2018 | Locke | G05B 23/0216 |
| 2019/0187634 | A1* | 6/2019 | Fan | F24F 11/65 |
| 2019/0264943 | A1* | 8/2019 | Gagnon | G05B 13/048 |
| 2020/0133213 | A1* | 4/2020 | Park | G05B 15/02 |
| 2021/0064792 | A1 | 3/2021 | Kim et al. | |
| 2021/0192111 | A1 | 6/2021 | Hoyer et al. | |
| 2021/0365603 | A1 | 11/2021 | Gu et al. | |

FOREIGN PATENT DOCUMENTS

| CN | 109670583 A | 4/2019 |
|---|---|---|
| KR | 102144102 B1 | 8/2020 |

* cited by examiner

*Primary Examiner* — Christopher E. Everett
(74) *Attorney, Agent, or Firm* — Plumsea Law Group, LLC

(57) ABSTRACT

Systems and methods for automatically adjusting the control settings of one or more adaptive systems in an adaptive space are disclosed. For example, the embodiments provide systems and methods for automatically controlling lighting, climate, and furniture layout in an adaptive space. The systems and methods utilize real-time sensed information from the adaptive space (as well as occupants within the adaptive space) to adaptively modify the living space by adjusting, for example, lighting, climate, and furniture layout. Adaptation is enabled using a hierarchy of machine learning models that can synthesize different kind of sensory information and predict human behaviors in the adaptive space. In response to predicted behaviors, the systems and methods can be used to automatically change aspects of the adaptive space so as to satisfy the behavioral needs of the occupants.

20 Claims, 12 Drawing Sheets

| BEHAVIOR | CONTROL SYSTEM | CONTROL SETTING |
|---|---|---|
| SWEATING | CLIMATE CONTROL | REDUCE TEMPERATURE IN ROOM |
| GETTING TIRED | ROBOTIC FURNISHING | EXTEND BED |
| GETTING TIRED | LIGHTING SYSTEM | TURN DOWN LIGHTS |
| STUDYING | ROBOTIC FURNISHING | OPEN DESK AREA |
| STUDYING | LIGHTING SYSTEM | TURN UP LIGHTS |

FIG. 6

SYSTEMS AND METHODS FOR ADAPTIVE SPACES

TECHNICAL FIELD

The present disclosure generally relates to adaptive spaces and, in particular, to machine learning systems and methods for controlling adaptive spaces.

BACKGROUND

With the increase of IoT systems in homes and offices, the use of these spaces can be made more adaptive, based on the needs or preferences of its users and occupants. For example, users can easily adjust temperature and lighting in a living space via voice commands or applications on their phones. Some systems can automatically adjust, for example, climate control settings in a home according to time of day and/or learned climate control schedules. It is also possible to incorporate robotic furniture into these adaptive spaces. This furniture may automatically be repositioned within a room according to user commands so as to change the layout and/or function of a space. As new adaptive features (such as adaptive lighting and robotic furniture) are added to adaptive spaces, it becomes cumbersome for users to constantly adjust settings of one or more of these different systems manually. Moreover, new occupants of a space may not even be aware of the possible settings for the various systems, or which settings may be optimal for what an occupant is trying to do within a space.

There is a need in the art for a system and method that addresses the shortcomings discussed above.

SUMMARY

In one embodiment, the systems and methods provide a way to control an adaptive space using multi-level machine learning. At one level, one or more machine learning models receive sensed data and generate predictions. The one or more machine learning models could be selected and trained to make predictions for different kinds of data such as (for example and without limitation): audio data, image data, and/or physiological data associated with occupants in the adaptive space. The predictions of the one or more machine learning models are provided to another level of machine learning model(s) that predict behaviors for the occupants in the adaptive space. Exemplary predicted behaviors could include (for example and without limitation), sleeping, performing, exercising, or watching television. The predicted behaviors are mapped to particular control settings that can be sent to, and used by, one or more control systems in the adaptive space with the intention of satisfying the behavioral needs of the occupants in the adaptive space.

In one aspect, a method of determining and applying control settings for a control system in an adaptive space includes receiving first sensed data collected using a first sensor and second sensed data collected using a second sensor. The method also includes providing the first sensed data as input to a first machine learning model and the second sensed data as input to a second machine learning model. The method also includes generating, using the first machine learning model, first predicted data based at least on the first received sensed data, and generating, using the second machine learning model, second predicted data based at least on the second received sensed data. The method also includes providing the first predicted data and the second predicted data as input to a third machine learning model and determining, using the third machine learning model, at least one predicted behavior. The method also includes providing the at least one predicted behavior as input to a behavior mapping module, determining, using a behavior mapping module and based at least on the one predicted behavior, at least one setting of a control system corresponding to an adaptive space, and transmitting the at least one setting to the control system.

In another aspect, a method of determining and applying control settings for a control system in an adaptive space includes receiving first sensed data collected using a first sensor and second sensed data collected using a second sensor. The method also includes providing the first sensed data as input to a first machine learning model and the second sensed data as input to the second machine learning model, generating, using the first machine learning model, first predicted data based at least on the first sensed data, and generating, using the second machine learning model, second predicated data based at least on the second sensed data. The method also includes providing the first predicted data and the second predicted data as input to a third machine learning model, determining, using the third machine learning model based on at least one of the first predicted data or the second predicted data, at least one predicted control setting for a control system corresponding to an adaptive space, and transmitting the at least one predicted control system setting to the control system.

In another aspect, a system includes one or more processors to receive first sensed data collected by a first sensor and second sensed data collected by a second sensor and provide the first sensed data as input to a first machine learning model and the second sensed data as input to a second machine learning model. The system also includes one or more processors to generate, using the first machine learning model, first predicted data based at least on the first sensed data, and generate, using the second machine learning model, second predicted data based at least on the second sensed data. The system also includes one or more processors to provide the first predicted data and the second predicted data as input to a third machine learning model and determine, using the third machine learning model and based on at least one of the first predicted data or the second predicted data, a predicted control setting for a control system. The one or more processors send the control system setting to the control system.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 6 is a schematic view of a table for mapping behaviors to control settings, according to an embodiment;

DESCRIPTION OF THE EMBODIMENTS

Figure 1:
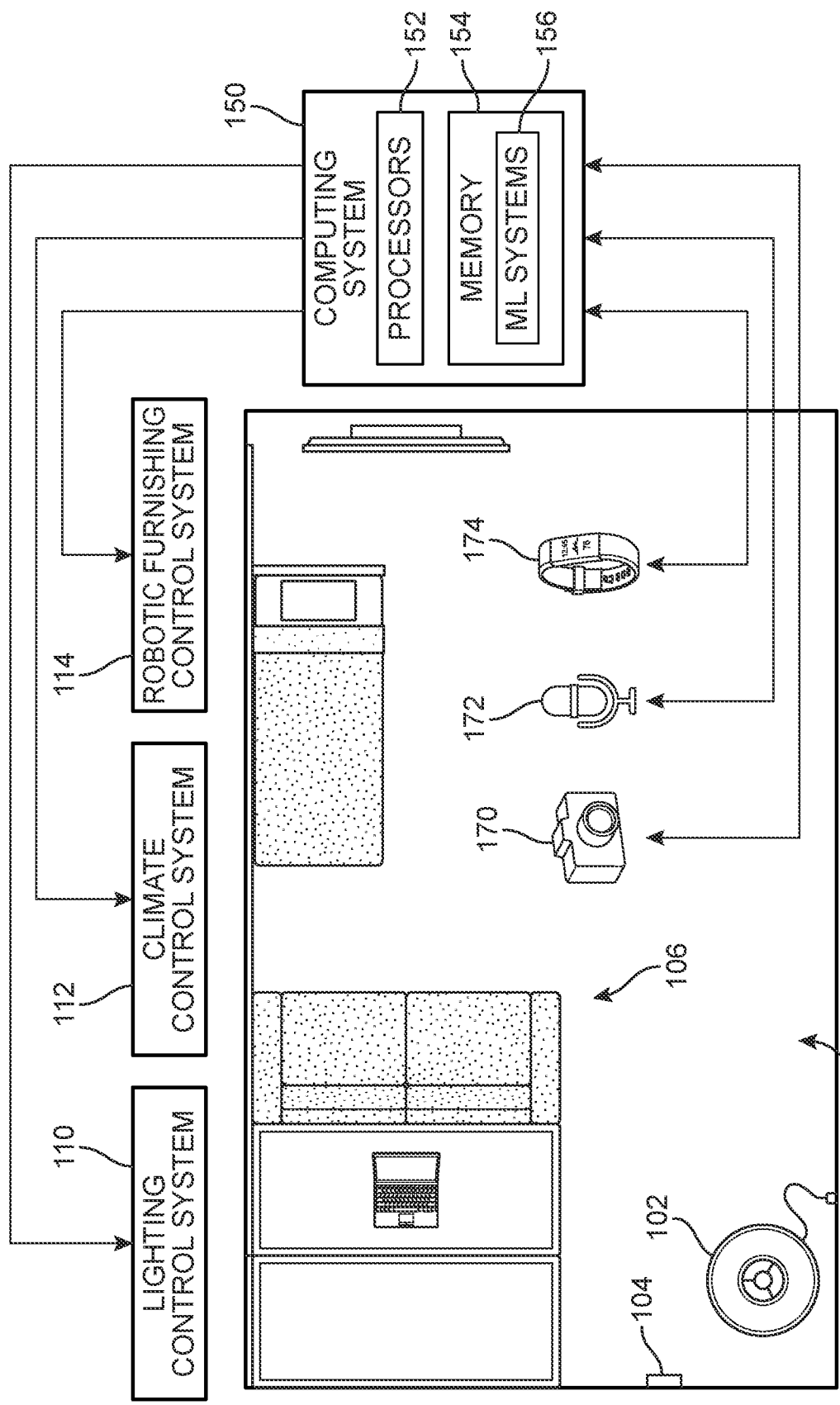
FIG. 1 is a schematic view of an adaptive room and systems for controlling the adaptive room, according to an embodiment.

Embodiments of the present disclosure provide systems and methods for automatically adjusting the control settings of one or more adaptive systems in an adaptive space. For example, the embodiments provide systems and methods for automatically controlling lighting, climate, and furniture layout in an adaptive space, without the need for an occupant of the space to initiate any kind of control. In particular, the systems and methods utilize real-time sensed information from the space (as well as occupants within the living space) to adaptively modify the space by adjusting, for example, lighting, climate, and furniture layout. Adaptation is implemented using a hierarchy of machine learning models that synthesize different kinds of sensory information, and predict human behaviors in the space. In response to predicted behaviors, the systems and methods can be used to automatically change aspects of the space to satisfy the behavioral needs and/or imputed preferences of the occupants or users. Thus, one or more embodiments adapt a space to automatically meet the needs or preferences of one or more users or occupants, without requiring any users or occupants to manually select settings for one or more adaptive systems.

Exemplary embodiments provide improvements over existing automated systems that can adapt features of a living space or workspace, each of which still require users to initiate control or else pre-load desired control settings into the automated systems. The exemplary systems and methods enable the adaptive room to adapt to new occupants who may not have knowledge of possible system settings (such as available lighting settings or possible configurations of robotic furniture). The exemplary systems and methods also reduce the burden imposed on occupants by other systems that would have the occupants constantly adjusting system settings using voice commands, physical buttons, and/or remote buttons (via a smartphone application, for example).

Various terms and definitions are gathered here for convenience.

The term "adaptive space" refers to any physical space, such as a room, which comprises one or more systems that can be adapted to suit different needs of one or more occupants at different times. Adaptive spaces can include "adaptive living spaces," where occupants may live, as well as "adaptive working spaces," where occupants may work. Examples of adaptive living spaces include living rooms, kitchens, bedrooms, and similar types of spaces typically found in various kinds of homes. For example, an adaptive room in an apartment could include robotic furniture that can be moved to accommodate different types of activities at different times (such as sleeping, studying, watching television, and cooking). Examples of adaptive working spaces include offices, factory areas, retail spaces, as well as other suitable workspaces. For example, an adaptive office space may include robotic furniture that can be moved to accommodate different modes of working, such as open-office collaborations, large meetings, and independent work. This could be done using robotic walls and partitions that can be arranged to divide an office space or make it wide open.

The term "human behavior" refers to the potential and express capacity of human individuals or groups to respond to internal and external stimuli as individuals or as groups. Human behaviors can include physical behaviors, mental behaviors, social behaviors or combinations of physical, mental and social behaviors. Examples of human behaviors include, but are not limited to: sitting, standing, laying down, sleeping, studying, working, reading, playing games, watching television, yawning, sweating, shivering, eating, cooking, cleaning, engaging in conversation, as well as other suitable behaviors. Social behaviors are associated with groups of people, and potentially their associated devices. For example, people may gather to brainstorm using a physical whiteboard or through their devices in a virtual space. Similarly, two people may communicate such that one person is teaching and the other is learning.

The term "adaptive system" refers to any system that can change its state in response to some input or control signal. Adaptive systems may comprise both actuated components and control systems. The control systems can receive signals and modify the state of the actuated components in response to those signals. Different states of the adaptive system may be associated with different "control system settings" of the associated control system. Exemplary adaptive systems can include, but are not limited to: adaptive climate systems, adaptive lighting systems, and adaptive furnishing systems. For example, adaptive furnishing systems can include "robotic furniture," which is furniture that can change its location and/or configuration within a space using electromechanical power.

The term "machine learning model" refers to any suitable model that can be trained to output a predictive value in response to one or more inputs. Exemplary machine learning models include, but are not limited to: regression-based models, support vector machine models, decision tree models, neural network models, Bayesian models, deep learning models, including transformers, and other suitable models.

The terms "hierarchical machine learning system" or "multi-level machine learning model" refer to a system in which outputs from one or more machine learning models are provided as input to another machine learning model.

FIG. 1 is a schematic view of an adaptive space 100. In this example, adaptive space 100 may be a room in an apartment. Adaptive space 100 may further include one or more lights (for example, lamp 102) that can be adaptively controlled by lighting control system 110. Adaptive space 100 may also include a thermostat 104 that can be adaptively controlled by climate control system 112. Thermostat 104 may be wired directly to (or otherwise communicate with) heating and/or cooling systems associated with adaptive space 100. Adaptive space 100 may also include a robotic furnishing system 106 that is adaptively controlled by robotic furnishing control system 114.

Figure 2A:
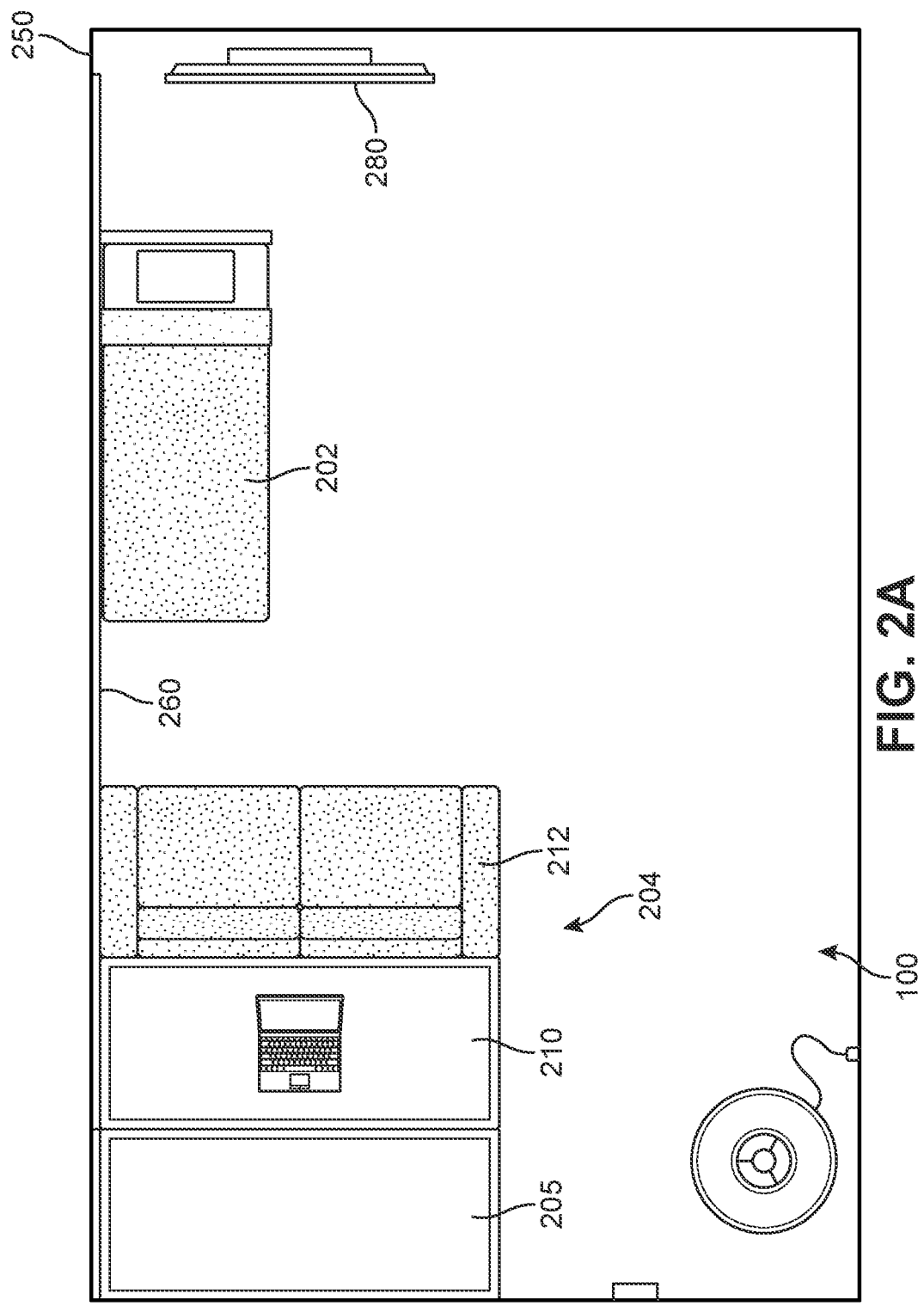
FIGS. 2A-2D are schematic views showing different configurations for robotic furnishings within an adaptive room, according to an embodiment.

Referring to FIG. 2A, robotic furnishing system 106 may further include a robotic bed 202 and a robotic hybrid furnishing 204. Hybrid furnishing 204 is further comprised of a desk 210 and a couch 212. In some cases, desk 210 and couch 212 are both mounted to a common support frame (not shown) and are moveable together as a single component.

In some embodiments, adaptive room 100 may also include a fixed desk 205, which may not have automated means for repositioning or relocation. Adaptive room 100 may also include a television 280, which is mounted to a wall of adaptive room 100.

Figure 2B:
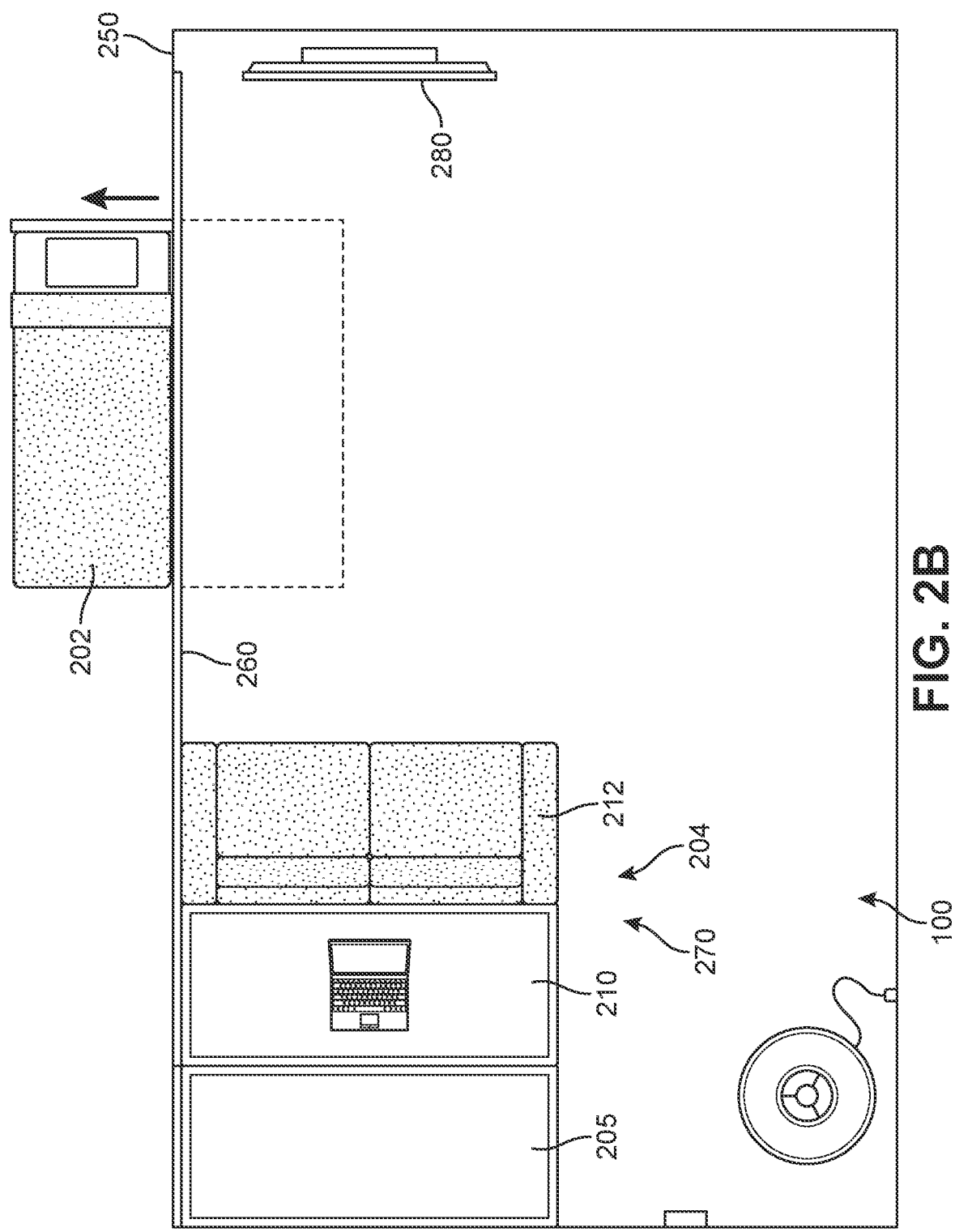

In operation, robotic bed 202 can be extended and retracted within a slot (not shown) in wall 250 of room 100, as shown in FIGS. 2A-2B. When extended into room 100, robotic bed 202 provides a place for an occupant to sleep.

Figure 2C:
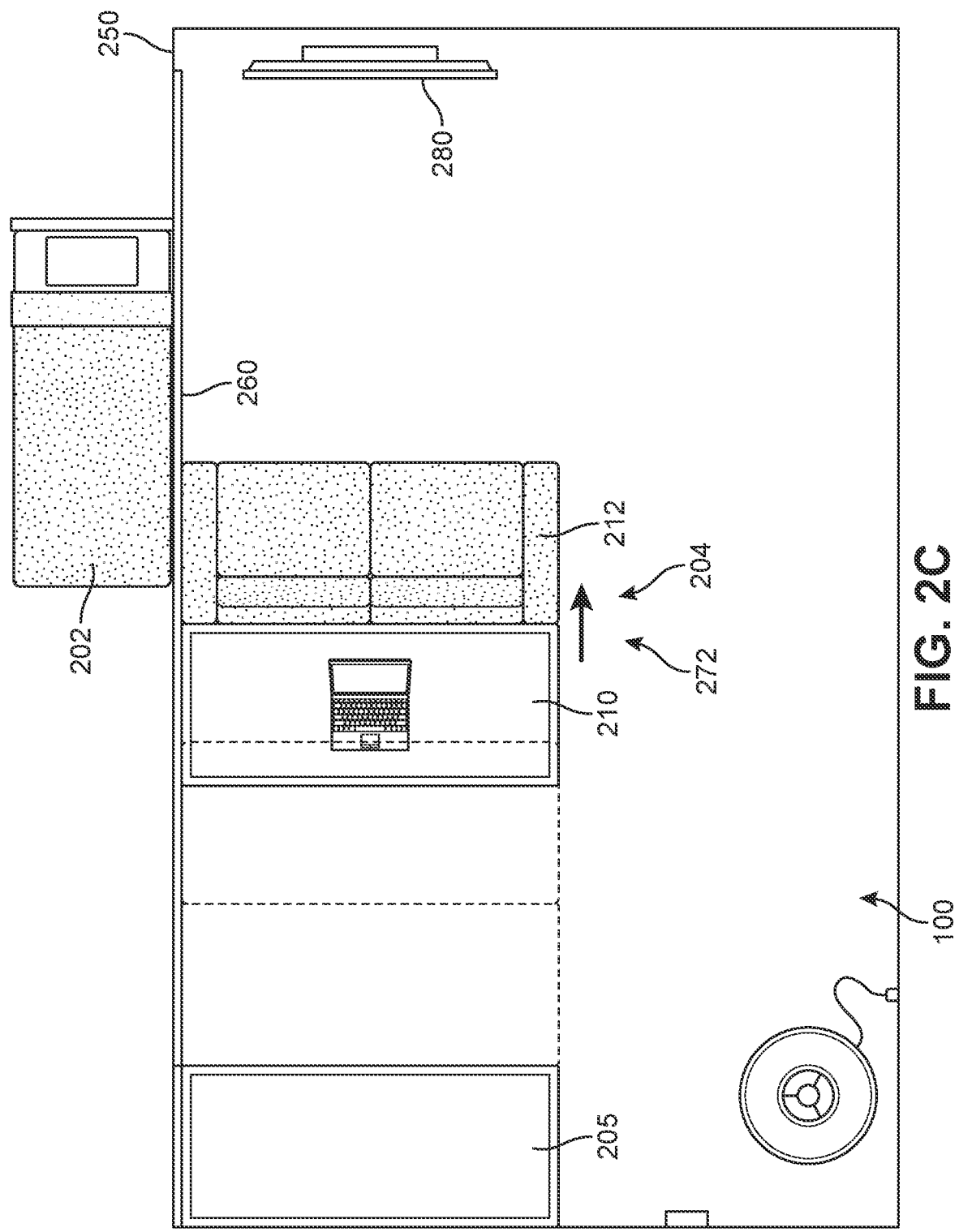
Figure 2D:
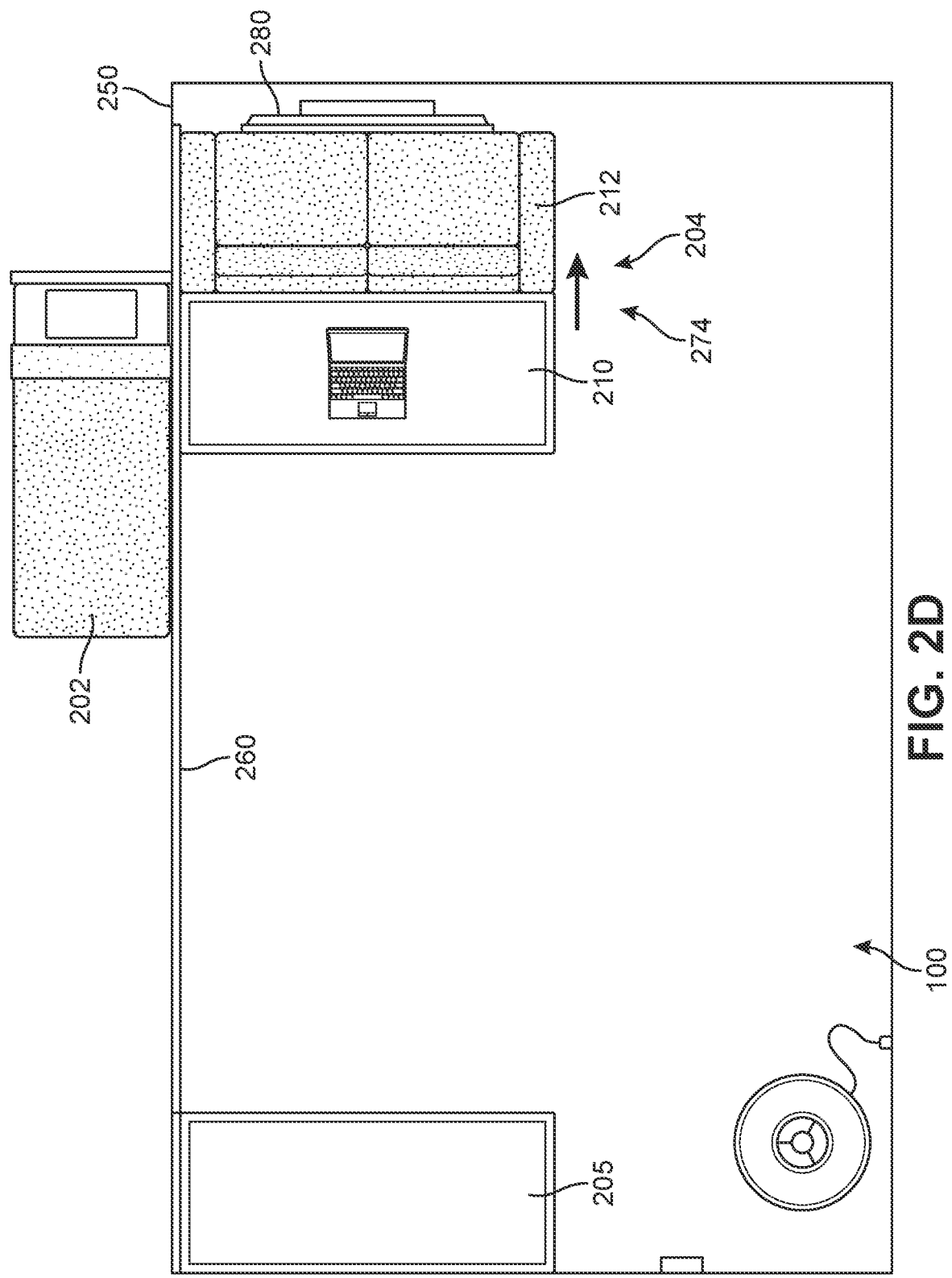

In operation, hybrid furnishing 204 can slide along a support rail 260, thereby autonomously moving between different positions within room 100. For example, FIGS. 2B-2D show how hybrid furnishing 204 can move between a first position 270 (in FIG. 2B), a second position 272 (in FIG. 2C), and a third position 274 (in FIG. 2D). As hybrid furnishing 204 is moved to different positions within room 100, it may provide different functionality for any occupants of the room.

Referring now to FIGS. 2A-2D, robotic furnishing system 106 can adapt to different configurations according to the needs of its occupants. For example, in a first configuration shown in FIG. 2A, bed 202 is fully extended within room 100 and hybrid furnishing 204 is moved to its first position 270. In this configuration, an occupant can lay on bed 202 to sleep.

In a second configuration shown in FIG. 2B, bed 202 is fully retracted within wall 250 to provide additional floor space within room 100 adjacent couch 212 and television 280. This allows occupants to comfortably watch television 280. Thus, this second configuration provides a useful entertainment space for occupants.

In a third configuration, shown in FIG. 2C, hybrid furnishing 204 has been moved to its second position 272, which allows occupants to make use of both desks (fixed desk 205 and moveable desk 210). In this configuration, there is still sufficient space for some occupants to also sit on couch 212.

In a fourth configuration, shown in FIG. 2D, hybrid furnishing has been moved to its third position 274. In this configuration, couch 212 is pushed directly adjacent to television 280 so that couch 212 can no longer be used. However, the increased distance between desk 205 and desk 210 provide additional space where multiple occupants can work simultaneously.

It may be appreciated that FIGS. 2A-2D are intended to provide an example of how robotic furnishings can be adjusted within an adaptive living space. However, it may be appreciated that many other possible configurations could be achieved depending on the type of adaptive space, the specific robotic furnishings used, and the set of possible uses for the adaptive space. Other embodiments could incorporate any other suitable robotic furnishings including robotic beds, robotic chairs, robotic closets, robotic shelves, robotic window treatments (such as curtains and blinds), and robotic tables.

Referring back to FIG. 1, the embodiments provide systems and methods for automatically adjusting one or more adaptive systems automatically, without requiring manual input from occupants within the adaptive space. These include systems and methods for automatically adjusting lighting, climate, and the furniture layout of an adaptive room based on sensing data from the room, processing the data, and providing instructions to one or more control systems.

One or more embodiments use a computing system 150 for processing input and providing output to one or more control systems. Computing system 150 may comprise any suitable computing device that is integrated into adaptive space 100 or running on a mobile device. Exemplary computing devices include, but are not limited to, desktop computers, tablet computers, and smartphones. Alternatively, computing system 150 could comprise a stand-alone computing device integrated into one or more components of adaptive room 100.

Computing system 150 can include one or more processors 152 and memory 154. Memory 154 may be any suitable non-transitory medium that can store instructions that are executable by processors 152. Memory 154 may store one or more machine learning systems 156 ("ML systems 156").

Inputs to ML systems 156 can include any suitable kinds of sensed data. In some cases, sensed data can include image data (including video data) received from one or more cameras 170 associated with room 100. In some cases, sensed data can include audio data received from one or more microphones 172 associated with room 100. Cameras and microphones could be integrated into room 100 or may be disposed in a mobile device that is carried or worn by an occupant (such as a smartphone).

In some cases, sensed data can include biophysical data received from one or more physiological sensors (such as those embedded in smartwatch 174) associated with room 100. This allows physiological data for one or more occupants in a room to be captured and processed.

In operation, data is sensed in real time to discern the behavior of one or more occupants in the room. The sensed data is processed by machine learning systems which then output one or more control settings to modify the operation of any of lighting control system 110, climate control system 112, and/or robotic furnishing system 114. Thus, adaptive space 100 is constantly adjusting in response to the changes in an occupant's behavior, acting to anticipate their needs and adjust accordingly before they have to manually request changes to lighting, temperature, and/or furniture layout.

Each control system may comprise suitable computing devices that include processors and memory for receiving commands and sending control signals to one or more actuatable systems. In some cases, lighting control system 110 could be embedded within one or more smart lights. In other cases, lighting control system 110 could be installed within or near room 100, and may communicate with various smart lights, or smart plugs. In some cases, climate control system 112 may be integrated into a smart thermostat (for example, thermostat 104). In some cases, robotic furnishing control system 114 can be integrated into one or more components of robotic furnishing system. In other cases, robotic furnishing control system 114 could be installed within or near room 100, and may communicate with various robotic furnishings.

Figure 3:
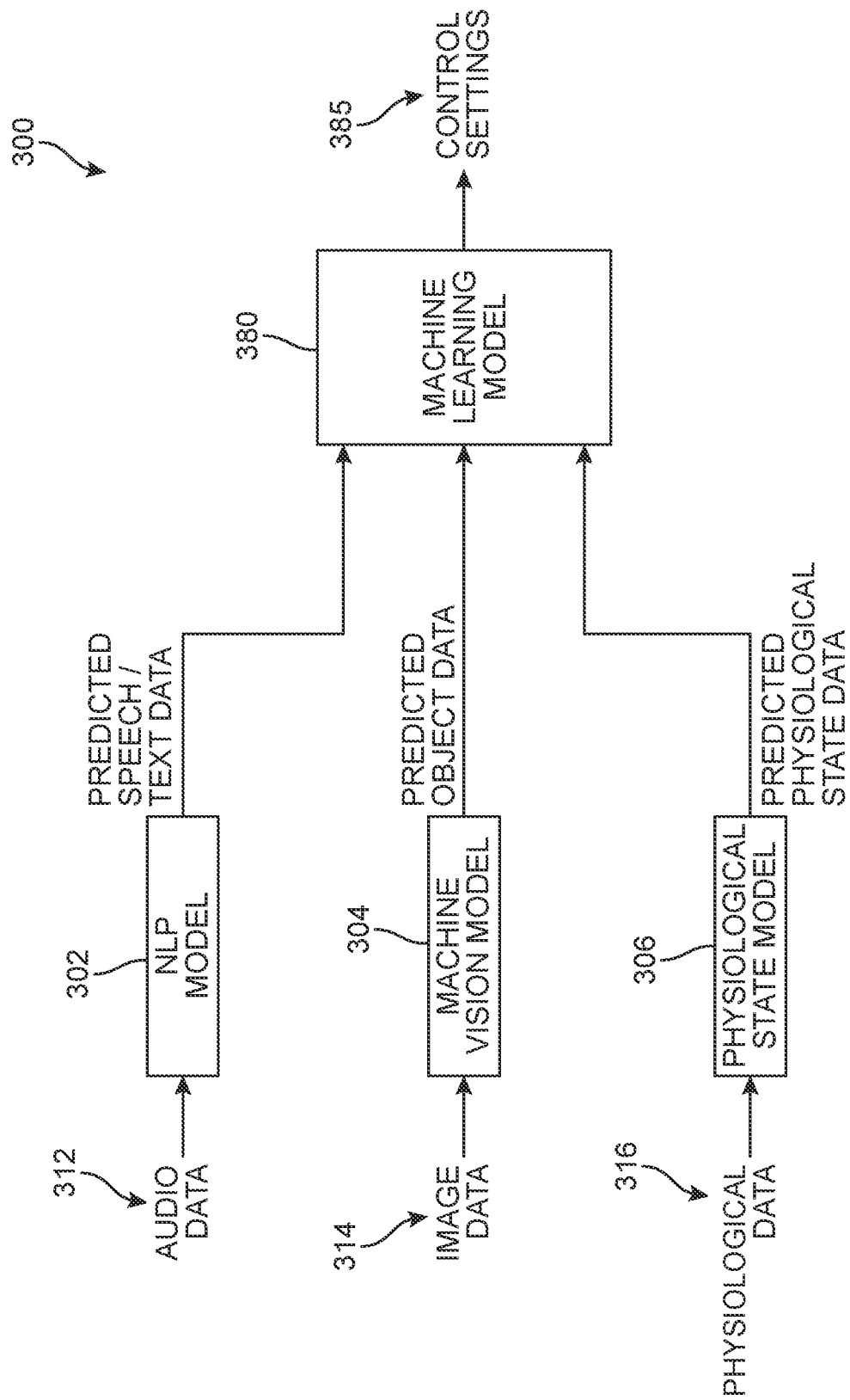
FIG. 3 is a schematic view of a machine learning architecture for outputting control settings for control systems in an adaptive room, according to an embodiment.

FIG. 3 is a schematic view of a hierarchical machine learning system 300 ("ML system 300"). ML system 300 is comprised of multiple machine learning models that receive direct sensory data from one or more sensors. These include a natural language processing model 302 ("NLP model 302"), a machine vision (or computer vision) model 304, and a physiological state model 306.

NLP model 302 may receive audio data 312 from one or more microphones. NLP model may be comprised of any suitable machine learning algorithms for natural language processing, including both speech detection/recognition and natural language understanding. In some cases, audio data could first be converted into text using any suitable speech recognition model. Suitable speech recognition models could comprise, for example, Hidden Markov Models. In some embodiments, NLP model 302 could comprise a long short-term memory (LSTM) recurrent neural network model for natural language understanding. In other embodiments, NLP model 302 could comprise a transformer-based learning model for language understanding. NLP model 302 may be trained using training audio data. In other cases, where a pre-trained speech detection model has been used, speech-to-text could be bypassed so that the model could be trained directly using text data. Predicted data includes predicted speech, context, and/or intent information. That is, NLP model 302 can be trained to predict, based on input audio data, key words, conversational context, and/or intent of the speaker.

As an example, suppose an occupant in an adaptive room says to another occupant in the room "I'm getting tired." One or more microphones in the room (including, possibly, microphones on an occupant's own mobile phone) could capture the speech and pass it to NLP model 302 as audio data 312. In some cases, NLP model 302 may predict the corresponding text data for those spoken words. In other cases, NLP model 302 may predict additional context for the spoken words, such as intent, the identity of the speaker, and/or other information.

Machine vision model 304 receives image data 314 from one or more cameras. Machine vision model 304 can be comprised of any suitable models that can detect objects and/or people within images. In some embodiments, machine vision model 304 could comprise a region-based convolutional neural network. Predicted data can include predicted object data (such as a set of recognized objects and/or persons in an image) as well as contextual data that provides context about the relationship between two or more objects in an image.

As an example, suppose the occupant makes the statement "I'm getting tired" while sitting on a couch in an adaptive room. One or more cameras in the room (including, possibly, cameras on an occupant's own mobile phone) could capture images and/or video of the occupant on the couch and pass it to machine vision model 304 as image data 314. In some cases, machine vision model 304 may then automatically detect the occupant in the image as well as the couch. In some cases, machine vision model 304 may also predict additional context such as predicting that the occupant is sitting on the couch.

Physiological state model 306 receives physiological data 316 from one or more sensors. Physiological state model 306 could be any suitable machine learning model. In cases where time-series data, such as heart rate data, is captured, physiological state model 306 could use any suitable time-series based models for inferring patterns in the time-series data. As an example, some time-series based models could include long-short term memory (LSTN) neural networks. Predicted data can include physiological state data.

As an example, suppose the occupant of the present example yawns after saying "I'm getting tired." A smartwatch worn by the occupant may detect motion of the occupant's arm and pass this motion data to physiological state model 306 as physiological data 316. Additionally or alternatively, a heart rate or blood pressure monitor may detect the occupant's heart rate and/or blood pressure, respectively, has decreased to levels correlative with fatigue. Based on the received motion data, physiological state model 306 may predict that the occupant has yawned and/or is fatigued.

In the exemplary embodiment, NLP model 302, machine vision model 304, and physiological state model 306 may be characterized as first level models within a broader hierarchical machine learning system (ML system 300). The purpose of the first level models is to detect patterns in a single type of sensory data to extract predictions related to that particular type of sensed data in the environment. These individual predictions may then be supplied to another machine learning model 380, which may be characterized as a second (or higher) level model. This second level machine learning model learns patterns among the set of all predictions provided by the various first level models. Thus, machine learning model 380 can learn patterns among combinations of spoken words, detected objects/occupants, and physiological states and output appropriate control settings 385. In some cases, these learned patterns are then leveraged to predict explicit human behaviors, which can be used to determine appropriate control settings for control systems in an adaptive space. In other cases, these learned patterns are leveraged to directly predict control settings for control systems in an adaptive space without explicitly predicting intermediate human behaviors.

FIGS. 4-7 show one embodiment for a hierarchical machine learning system 400 including a machine learning model 480 that receives predictions from first level models and outputs instructions for one or more control systems. In this embodiment, human behaviors are explicitly predicted as an intermediate step in determining settings for one or more control systems of an adaptive room.

Figure 4:
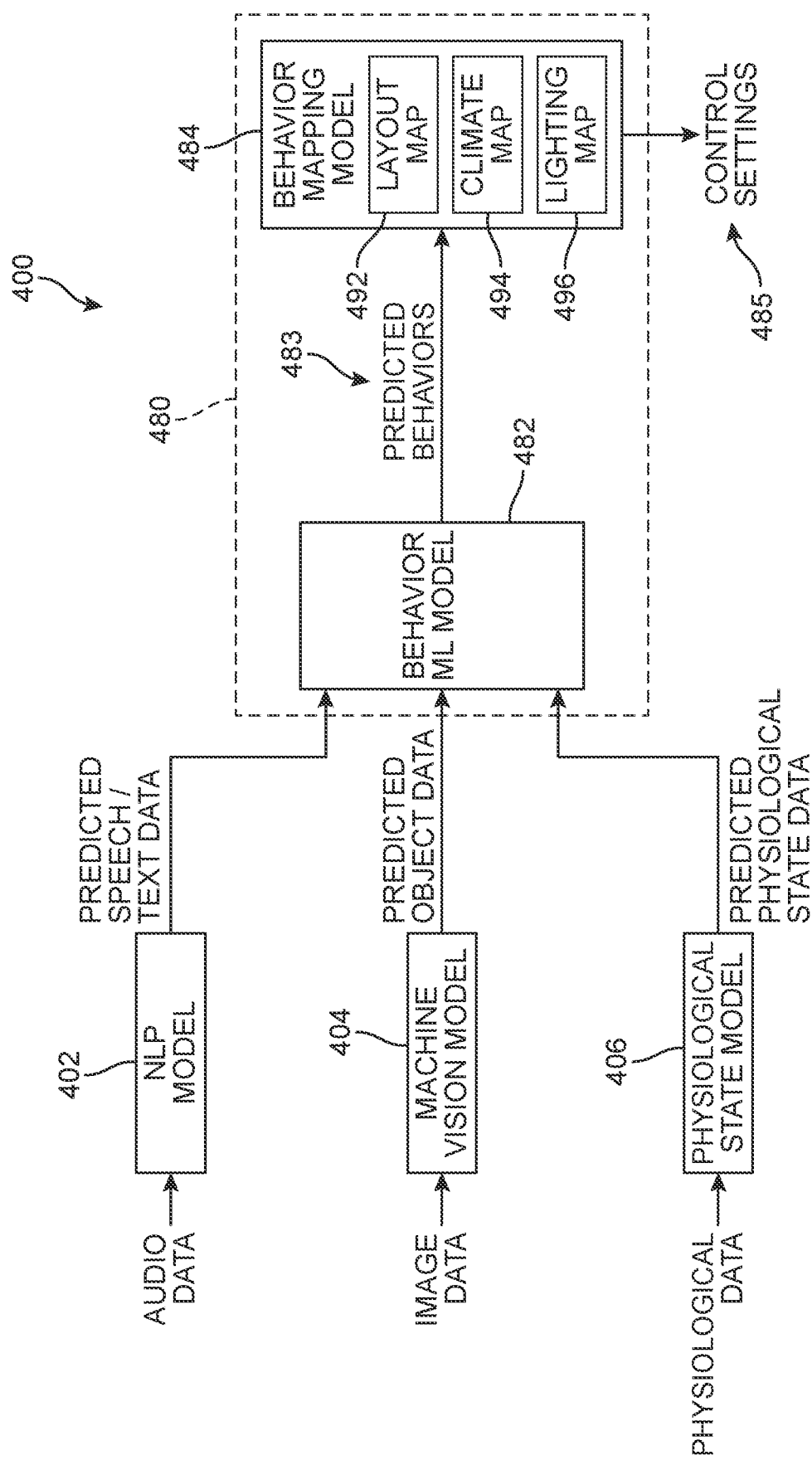
FIG. 4 is a schematic view of one implementation of a machine learning architecture, according to one embodiment.
Figure 5:
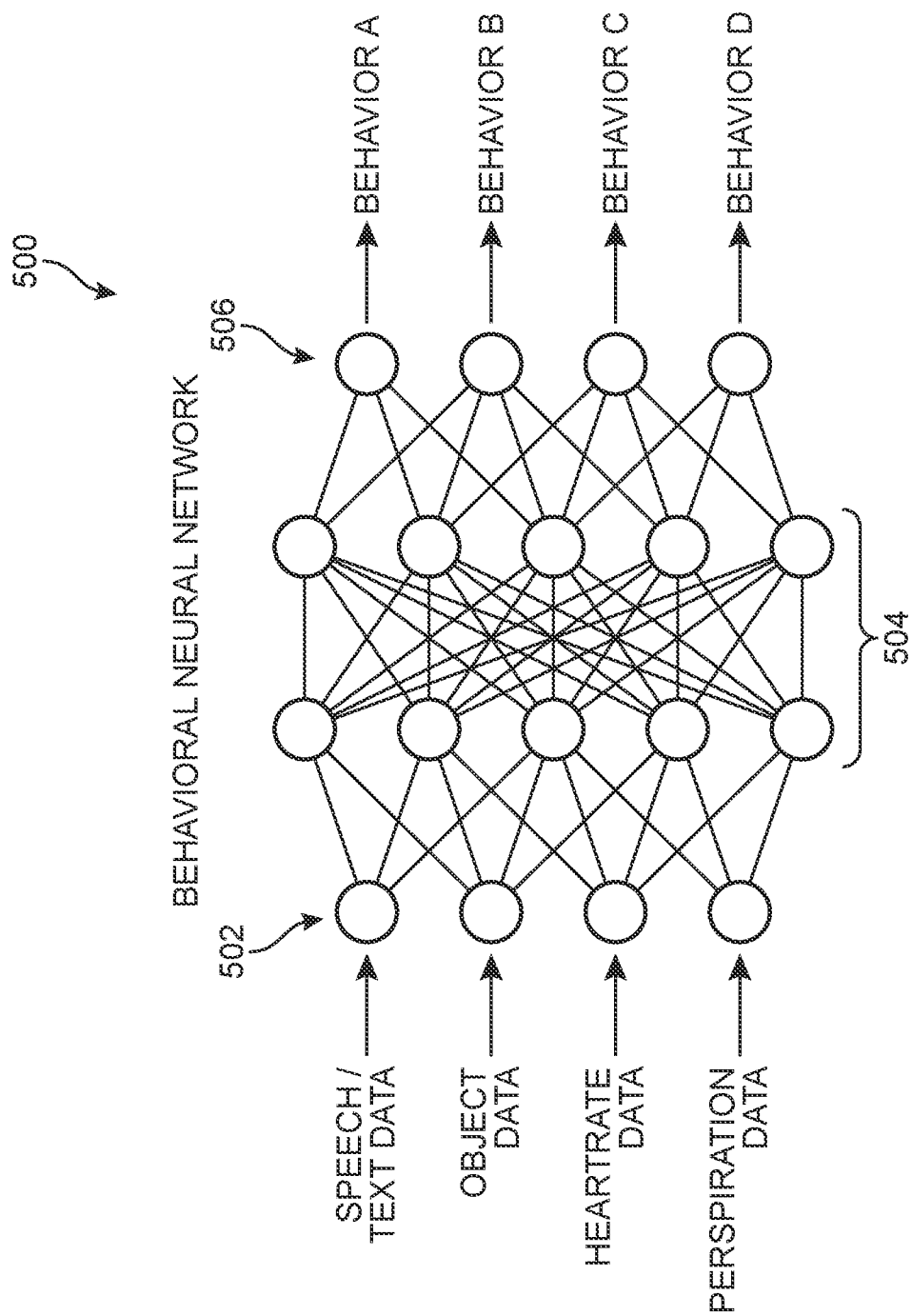
FIG. 5 is a schematic view of a behavioral neural network, according to an embodiment.

Referring first to FIG. 4, the architecture of machine learning model 480 comprises both a behavioral machine learning model 482 ("behavioral ML model 482") and a behavior mapping module 484. Behavioral ML model 482 receives predicted data from the first level models (for example, NLP model 402, machine vision model 404, and physiological state model 406) and outputs predicted behaviors 483.

Behavioral ML model 482 can be implemented as any suitable machine learning model. In one embodiment, shown in FIG. 5, behavioral ML model 482 may be implemented as a deep neural network 500. In this example, input nodes 502 may comprise data that has been predicted by one or more first level models (for example, speech data, object data, heartrate data, and perspiration data). These inputs are transformed via various hidden layers 504 into values at output nodes 506. In the exemplary embodiment, each output node corresponds to a particular behavior (labeled in FIG. 5 as "Behavior A," "Behavior B," "Behavior C," and "Behavior D"). That is, the predicted data from the first level models are used to predict one or more behaviors for occupant(s) in the adaptive space.

Exemplary behaviors that could be predicted include, but are not limited to: sitting, standing, laying down, sleeping, studying, working, reading, playing games, watching television, yawning, sweating, shivering, eating, cooking, cleaning, and engaging in conversation. It may be appreciated that this list of behaviors is not intended to be exhaustive and in other embodiments any suitable behaviors could be identified and predicted using an appropriate model. Moreover, behaviors could be predicted for individuals within a space and/or for groups.

Referring back to FIG. 4, the predicted behaviors output by behavioral ML model 482 are used as inputs to behavior mapping module 484, which outputs control settings 485. In some cases, a single map may be used for all control systems. In other cases, individual maps may be used for each separate control system. For example, in the embodiment of FIG. 4, behavior mapping module 484 comprise a layout map 492 (for robotic furnishing), a climate map 494, and a lighting map 496.

In different embodiments, behavior mapping module 484 can be implemented with different kinds of maps. In some embodiments, additional machine learning models can be trained and used to predict the best control settings for a given set of input behaviors. For example, in some embodiments, behavior mapping module 484 could comprise one or more neural network models.

In some embodiments a look-up table 600 can be used for mapping behaviors to various control settings, as shown in FIG. 6. For example, if a behavioral ML model has predicted that an occupant is sweating, then the system could be instructed to "reduce temperature in room" (the control setting) for the climate control system. Other examples include, upon predicting that an occupant is tired, extending a bed (using a robotic furnishing system) and turning down lights (using a lighting system). Additional examples include, upon predicting that an occupant is studying, opening up a desk area with the robotic furniture system and turning up the lights with the lighting system. Of course, these are only intended to provide some examples of mappings between predicted behaviors and specific control system settings. It may be appreciated that in practice, a behavioral mapping module could include a table or another kind of mapping that provides control system settings for dozens, hundreds, or even thousands of different predicted behaviors.

Figure 7:
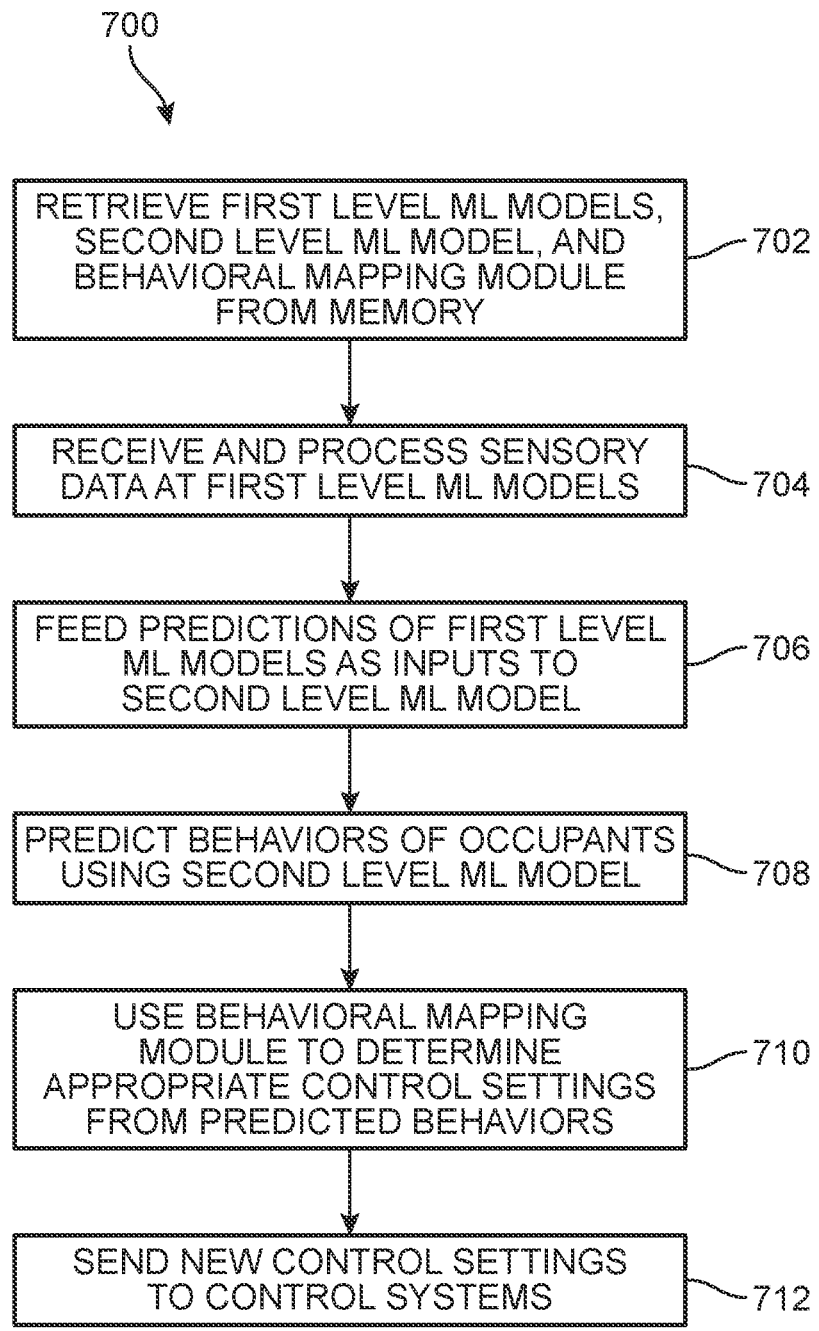
FIG. 7 is a schematic view of a process for predicting human behaviors and selecting appropriate control settings, according to an embodiment.

FIG. 7 is a schematic view of a process 700 for selecting and sending new control settings to control systems of an adaptive space. In some embodiments, one or more of the following steps could be performed by a computing system, such as computing system 150 (see FIG. 1).

In a first step 702, computing system 150 may retrieve, from memory, a hierarchical machine learning system, including first and second level machine learning models, as well as a behavioral mapping module. In some embodiments, one or more of the machine learning models could be pre-trained. In other cases, the exemplary process could include additional steps of training one or more of the models.

Next, in step 704, computing system 150 may receive sensory data from one or more sensors associated with an adaptive space. This sensory data may include, but is not limited to, audio data, image data, and physiological data. This sensory data can be processed using the first level machine learning models (such as NLP models, machine vision models, and physiological state models).

Predictions from the first level machine learning models could then be passed (that is, used as inputs) to the second level machine learning model in step 706. The second level machine learning model may then predict behaviors for occupants in the adaptive space in step 708.

Next, in step 710, the behavioral mapping module can be used to determine the appropriate control settings for the predicted behaviors. For example, in some cases, a look-up table could be used to determine appropriate control settings for one or more control settings according to the predicted behaviors provided by the second level machine learning model. In other cases, a pre-trained neural network could be used to predict control settings from the predicted behaviors.

In step 712, computing system 150 may send the control settings determined in step 710 to the appropriate control systems. These control settings may then be implemented by each corresponding control system to optimize the adaptive space for the one or more occupants according to their behaviors.

Using the present architecture, a system can be trained to detect human behavior explicitly, which can then be mapped to suitable control settings using other machine learning models and/or other mechanisms such as look-up tables. Such a configuration allows for a system that can be finely tuned to predict human behaviors, allowing those behaviors to inform a wide variety of different applications.

It may be appreciated that a system can respond to current behaviors in order to optimize future behaviors for occupants. For example, if a person's behavior(s) indicate they are tired (by yawning, saying they are tired, or slumping over in their seat) the system selects control settings that facilitate another kind of behavior that may be optimal to the occupant, such as extending a bed and turning down the lights to allow the occupant to go to sleep (a new behavior). In some cases, rather than predicting current behaviors, a system may predict the desired or optimal future behaviors. That is, the system could predict behaviors the occupant intends to do in the future, such as watch TV, or study. For example, monitoring audio and video data may allow a system to detect that an occupant is planning to watch television soon. The system can them select appropriate control settings according to this predicted future behavior. In either case, a system can be configured to predict behaviors (either present or future/desired behaviors) in order to adjust control settings optimally. In some cases, a system can predict a combination of present and future behaviors in order to select optimal control settings for current and/or future behaviors.

Figure 8:
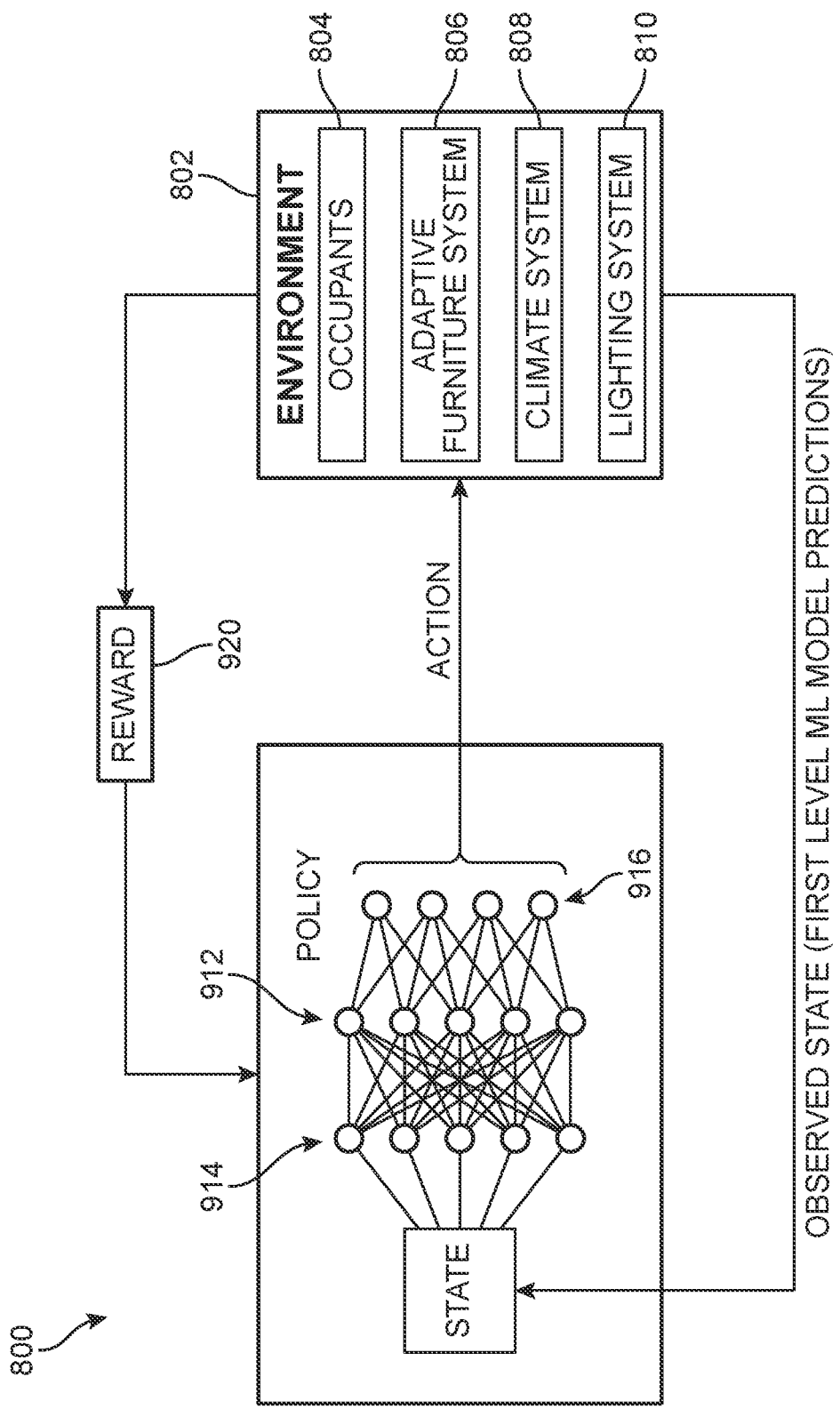
FIG. 8 is a schematic view of an architecture for predicting control settings, according to an embodiment.
Figure 9:
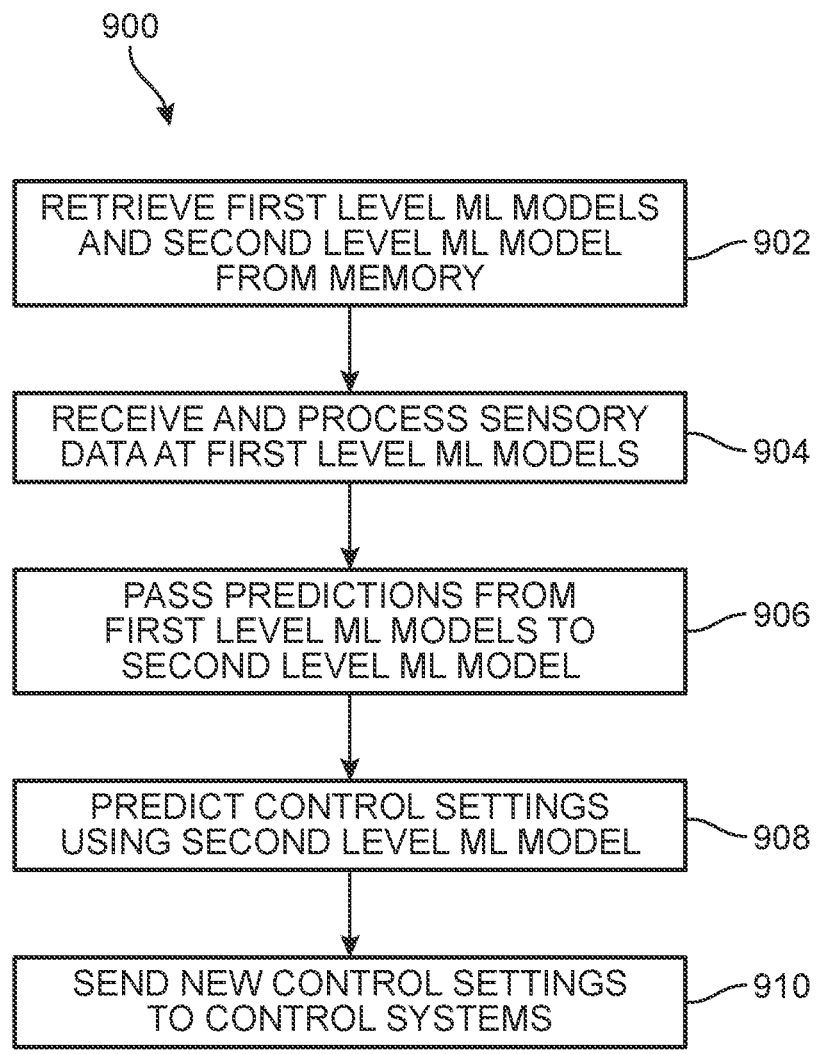
FIG. 9 is a schematic view of a process for predicting control settings, according to an embodiment.

FIGS. 8-9 show another embodiment of a second level machine learning system that learns appropriate control settings based on predictions from first level machine learning models. In this embodiment, human behaviors may not be explicitly predicted, as in the earlier embodiment. Instead, a second level machine learning model learns control settings from data predicted by the first level models (for example, NLP model 302, machine vision model 304, and physiological state model 306 of FIG. 3).

Because the exemplary machine learning model receives predicted data that is closely related to the environment of the adaptive space, and because its outputs are used to adjust features of the adaptive space, some embodiments of the machine learning model could be implemented as a reinforcement learning model. In a reinforcement learning model, an agent makes observations of, and interacts with, an environment. The agent may receive rewards as part of this interaction process. Over time, the goal of reinforcement learning is for the agent to learn to take those actions that provide the most benefit (rewards).

FIG. 8 is a schematic view of a reinforcement learning architecture 800 for a machine learning model that predicts control settings based on inputs from first level machine learning models. Here, the environment 802 corresponds to features of the adaptive space (such as room 100 in FIG. 1). More specifically, environment 802 includes occupants 804, robotic furniture system 806, climate system 808, and lighting system 810.

Any suitable reinforcement learning models can be used. The embodiments employ Q-learning models, in which a Q-function is trained to learn appropriate policies for taking actions in response to given environmental conditions. Exemplary Q-learning models include, but are not limited to: deep Q-learning and double deep Q-learning models.

The second level ML model of the present embodiment includes a deep-Q network 912 which uses a deep neural network to train and implement Q-learning policies. These Q-learning policies are represented by a Q function that takes in state variables (the input nodes 914) and outputs Q-values for possible actions (the output nodes 916). The action(s) with the highest Q-value(s) can then be implemented. In this embodiment, the actions correspond to changing the control settings of one or more control systems in an adaptive space. For example, actions could include automatically moving one or more pieces of robotic furniture, changing the lighting of one or more lights, and/or modifying the climate in the room.

Once an action has been taken, the state of the environment changes. These changes include changes in occupant behaviors, which can be detected as changes in sensory data from the environment. In response to changes in the sensory data, the predictions of the first level machine learning models may be updated ("observed state"), which changes the inputs of the deep-Q network 912, and thereby modifies the actions to be taken. Thus, in this way, the system continually adapts to changes in the environment.

To help guide the system towards optimal configurations of the various adaptive systems (furniture, climate, and lighting, for example), rewards (reward 920) can be generated using feedback from the environment. This can include both direct and indirect feedback. Examples of direct feedback include asking occupants of an adaptive space if they are satisfied with recent changes to the environment (for example, changes to the furniture, lighting, and/or climate). Direct feedback could be solicited via an application running on a smart phone, through verbal exchanges via a voice assistant, or through any other suitable channel. For example, after a new action has been taken by the exemplary system, the system could prompt one or more occupants to provide their level of satisfaction with the changes. These prompts could be initiated by a computing system (for example, computing system 150) via communication with an occupant's mobile device and/or via interactions with a smart speaker in the adaptive space.

Examples of indirect feedback include monitoring one or metrics related to the environment. For example, if a system is trying to learn how to move furniture into optimal locations according to user behavior, the system could track instances where an occupant is using furniture as intended (or instances where an occupant is using furniture in an unintended way). One part of a reward function, therefore, could check to see if occupants are sitting in chairs and couches, or if they are sitting instead on the floor, since the latter may indicate that furniture in the room has not been optimally positioned. Other metrics that could be monitored to determine a reward include the density of occupants in a room, since too many or too few occupants gathered in a particular area of the space may be non-optimal according to the type of activities the occupants are engaged in.

FIG. 9 is a schematic view of a process for selecting and sending new control settings to control systems of an adaptive space. In some embodiments, one or more of the following steps could be performed by a computing system, such as computing system 150 (see FIG. 1).

In a first step 902, computing system 150 may retrieve, from memory, a hierarchical machine learning system, including first and second level machine learning models. In some embodiments, one or more of the machine learning models could be pre-trained. In other cases, the exemplary process could include additional steps of training one or more of the models.

Next, in step 904, computing system 150 may receive sensory data from one or more sensors associated with an adaptive space. This sensory data may include, but is not limited to, audio data, image data, and physiological data. This sensory data can be processed using the first level machine learning models (such as NLP models, machine vision models, and physiological state models).

Predictions from the first level machine learning models could then be passed (that is, used as inputs) to the second level machine learning model in step 906. The second level machine learning model may then predict control settings directly from these inputs in step 908.

In step 910, computing system 150 may send the control settings determined in step 908 to the appropriate control systems. These control settings may then be implemented by each corresponding control system to optimize the adaptive space for the one or more occupants according to their current behaviors.

Using the present architecture, a system can be trained to predict control settings directly from the outputs of first level machine learning models. This allows control settings to be optimized without having to determine and classify human behavior directly. Such a configuration allows for a system that can be finely tuned for specific applications.

For purposes of understanding the embodiments, a discussion of various scenarios where an adaptive room, specifically, adaptive room 100 shown in FIGS. 1 and 2A-2D) responds to occupant behaviors are described here.

Referring to FIG. 2A, consider a first scenario in which an occupant (not shown) is sleeping in bed 202. If the occupant rises early in the morning and moves around, the system could automatically detect the occupant's behavior in order to determine if any of the adaptive systems should automatically respond. For example, the system could sense visual and auditory information about the occupant and predict, using one of the exemplary machine learning architectures described above, that the occupant is performing behaviors such as "brushing teeth" and "getting dressed." These behaviors may indicate that the occupant is waking up. The system could then automatically send new control settings to robotic furnishing control system 114 (FIG. 1) to retract bed 202 as in FIG. 2B. Depending additional behaviors, the system could also send new settings to move hybrid furnishing 204 so that the occupant can use desk 205 and/or desk 210. Also, in some cases, the system could send new control settings to lighting control system 110 to turn up the lights.

Referring to FIG. 2C, consider a second scenario in which an occupant (not shown) is working at desk 210 while another occupant (not shown) is seated on couch 212. The system could automatically detect both occupant's behavior in order to determine if any of the adaptive systems should automatically respond. For example, the system could sense visual and auditory information about both occupants and predict, using one of the exemplary machine learning architectures described above, that both are "studying." For example, the occupant on the couch may be writing in a notepad and the two occupants may be discussing a topic that is determined, by the system, to be related to a school subject. The system could then automatically send new control settings to robotic furnishing control system 114 (FIG. 1) to increase the space between the two desks (desk 205 and desk 210) when the second occupant gets up off of the couch, providing increased working space for the two occupants at the desks, as in FIG. 2D.

Thus, these scenarios show how adaptive room 100, leveraging real-time sensed information and a multi-level machine learning architecture can automatically rearrange furniture, adjust lighting, and/or climate, in response to predicted behaviors of one or more occupants. This allows adaptive room 100 to respond without manual input from an occupant.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, smart watches, smart glasses, e-book readers, laptop or desktop computers, all-in-one computers, as well as various kinds of digital media players.

Some of the processes and methods described herein could be implemented on any suitable parallel processing systems. Parallel processing systems could be used to speed up training for machine learning systems. Parallel processing systems could also provide reduced latency for receiving data from sensors and processing the data in real time. Parallel processing systems can include suitable parallel computing platforms that leverage GPUs or ASICSs to perform general computing applications.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

I claim:

1. A method of determining and applying control settings for a control system in an adaptive space that is responsive to occupant behavior, comprising:
   receiving sensed audio data collected using a first sensor and processing the sensed audio data using a natural language processing (NLP) model to generate first predicted data;
   receiving sensed image data collected using a second sensor and processing the sensed image data using a computer vision (CV) model to generate second predicted data;
   determining, using at least one machine learning model (MLM), at least one predicted behavior based at least on the first predicted data and the second predicted data, wherein the at least one MLM comprises a plurality of output nodes, at least one output node of the plurality of output nodes corresponding to one or more human behaviors;
   determining, based at least on the at least one predicted behavior, at least one setting of a control system corresponding to an adaptive space;
   transmitting the at least one setting to the control system; and
   receiving, at the control system, the at least one control setting and implementing the at least one control setting to change the adaptive space.

2. The method according to claim 1, wherein the at least one predicted behavior comprises at least one of:
   getting tired; or
   studying.

3. The method according to claim 1, wherein determining the at least one setting includes using a behavior mapping module.

4. The method according to claim 1, wherein the CV model comprises a convolutional neural network (CNN) model.

5. The method according to claim 1, wherein the method further comprises:
   receiving sensed physiological data collected using a third sensor;
   processing the sensed physiological data using a physiological state model to generate third predicted data; and
   wherein determining the at least one predicted behavior further comprises using the third predicted data.

6. The method according to claim 1, wherein the at least one MLM comprises a neural network for predicting behavior.

7. The method according to claim 1, wherein the control system is a control system to control at least one of:
   an arrangement of one or more robotic furnishings disposed at least partially within the adaptive space;
   a climate of at least a portion of the adaptive space; or
   an illumination of at least a portion of the adaptive space.

8. The method according to claim 1, wherein the first predicted data comprises text data.

9. The method according to claim 1, wherein the second predicted data comprises information about objects in the adaptive space.

10. A method of determining and applying control settings for a control system in an adaptive space, comprising:
    receiving sensed audio data collected using a first sensor and processing the sensed audio data using a natural language processing model to generate first predicted data;
    receiving sensed image data collected using a second sensor and processing the sensed image data using a computer vision (CV) model to generate second predicted data;
    determining, using at least one machine learning model (MLM) and based on at least the first predicted data and the second predicted data, at least one predicted control setting for a control system corresponding to an adaptive space, wherein the at least one MLM is trained using reinforcement learning, the at least one MLM including input nodes corresponding to the first predicted data and the second predicted data and output nodes corresponding to changes in control settings for the control system;
    transmitting the at least one predicted control setting to the control system to a cause a change to the control system; and
    receiving and implementing the at least one predicted control setting at the control system.

11. The method according to claim 10, wherein the at least one control setting is related to temperature.

12. The method according to claim 10, wherein the at least one predicted control setting is related to position of robotic furniture.

13. The method according to claim 10, wherein the at least one predicted control setting is related to lighting in the adaptive space.

14. The method according to claim 10, wherein the control system is a control system to control at least one of:
    an arrangement of robotic furnishings at least partially disposed in the adaptive space;
    a climate of at least a portion of the adaptive space;
    an illumination of at least a portion of the adaptive space.

15. The method according to claim 10, wherein the second predicted data comprises information about objects in the adaptive space.

16. The method according to claim 10, wherein the at least one MLM is a deep Q network.

17. The method according to claim 10, wherein the method further comprises:
    receiving physiological data from a third sensor;
    processing the physiological data with a physiological state model to generate third predicted data; and
    wherein determining the at least one predicted control setting further comprises processing the third predicted data.

18. A system, comprising:
    a control system; and
    a computing system comprising one or more processors to:
    receive sensed audio data collected by a first sensor and process the sensed audio data using a natural language processing model to generate first predicted data;

receive sensed image data collected by a second sensor and process the sensed image data using a machine vision model to generate second predicted data;

determine, using at least one machine learning model (MLM) and based on at least the first predicted data and the second predicted data, a predicted control setting for a control system, wherein the at least one MLM is trained using reinforcement learning, the at least one MLM including input nodes corresponding to the first predicted data and the second predicted data and output nodes corresponding to changes in control settings for the control system; and send the predicted control setting to the control system to cause a change effected by the control system;

wherein the control system is configured to receive the predicted control setting and implement the predicted control setting.

19. The system according to claim 18, wherein the control system is a robotic furnishing control system that controls an arrangement of robotic furnishings at least partially disposed within an adaptive space.

20. The system according to claim 18, wherein the at least one MLM is a deep Q network.

\* \* \* \* \*